(12) United States Patent  
Anderson (10) Patent No.: US 8,066,025 B2
(45) Date of Patent: Nov. 29, 2011

(54) PIERCING VALVE STEM ASSEMBLY AND SYSTEM

(76) Inventor: Richard Anderson, Iron Mountain, MI (US)

( * ) Notice: Subject to any disclaimer, the term of this patent is extended or adjusted under 35 U.S.C. 154(b) by 782 days.

(21) Appl. No.: 12/098,296

(22) Filed: Apr. 4, 2008

(65) Prior Publication Data

US 2009/0250647 A1 Oct. 8, 2009

(51) Int. Cl.
*F16K 17/40* (2006.01)
(52) U.S. Cl. .................... 137/68.3; 137/318; 222/83
(58) Field of Classification Search .................. 137/318, 137/68.3; 222/83
See application file for complete search history.

(56) References Cited

U.S. PATENT DOCUMENTS

| 2,391,583 | A | * | 12/1945 | Martin | 239/309 |
|---|---|---|---|---|---|
| 2,875,777 | A | * | 3/1959 | Lacart | 137/318 |
| 2,881,011 | A | | 4/1959 | Coughlin | |
| 3,038,490 | A | * | 6/1962 | Yocum | 137/318 |
| 4,216,793 | A | | 8/1980 | Volgstadt | |
| 4,598,731 | A | | 7/1986 | Colson | |
| 5,169,122 | A | * | 12/1992 | Sunderland | 251/148 |
| 5,327,923 | A | | 7/1994 | Eischen | |
| 5,694,971 | A | | 12/1997 | Wilcock | |
| 5,967,197 | A | * | 10/1999 | Shown | 141/18 |

* cited by examiner

*Primary Examiner* — John Rivell
*Assistant Examiner* — Macade Brown
(74) *Attorney, Agent, or Firm* — Absolute Technology Law Group LLC (57) ABSTRACT

A simplified piercing valve stem assembly system and apparatus which includes a valve stem component to which a piercing point has been securely affixed, and an easily manufactured stub-out with a flattened or partially flattened end adapted for piercing.

12 Claims, 6 Drawing Sheets

PIERCING VALVE STEM ASSEMBLY AND SYSTEM

FIELD OF INVENTION

This invention relates generally to the field of plumbing, and in particular to a piercing valve stem.

BACKGROUND

The current practice in the construction of a new dwelling is to "rough-in" the waste and water supply lines where the new fixtures are to be located utilizing a stub-out pipe which generally protrudes from the wall or floor. A stub-out pipe is a short length of pipe installed during construction, which is connected to the main plumbing pipes. Fixtures are eventually installed and connected to the stub-out.

Currently, water line stub-outs generally consist of commercially available preformed pieces of copper pipe with a sealed, rounded end which protrudes from the wall or floor. Generally, plumbing systems must be pressure tested before fixtures are installed. Once the plumbing system has been pressure tested, it is common practice to leave the water supply turned on, with the water remaining in the lines.

In the past, plumbing rough-ins were accomplished by cutting the copper tubing used for plumbing and applying an end cap to the cut pipe. Current practice in the plumbing industry is to use copper or plastic tubing of various compositions to which a copper (or other metal) stub-out is attached.

When the plumber subsequently installs the new fixtures, it is presently required that the water supply be turned off, and the water in the lines drained away. The plumber must locate the water supply shutoff valve, turn off the water supply, and then drain the water from the system. The plumber then returns to the fixture, and uses a tube-cutting tool to cut off the sealed end of the stub-out and installs a commercially available angle stop device which allows the water to the fixture to be turned on and off. An angle stop is a device which connects to the water supply pipe in the wall and to the faucet or toilet. After installing the standard angle stop, the plumber then returns to the water supply shutoff valve and turns the water supply back on. At this point, there will likely be air remaining in the system, which can cause problems with any previously installed and functioning fixtures.

After restoring the water supply, the plumber then returns to the fixture, connects the supply line to the fixture and opens the angle stop supplying water to the fixture. A traditional angle stop works to control the flow of water to a fixture through the opening and closing of its valve [means] through the rotation of an exposed gripping member.

To stop the flow of fluids through a traditional angle stop, the operator turns the gripping member of the valve, either clockwise or counter-clockwise depending upon design, threading the valve stem further into the valve body and pressing the valve stem against the body of the valve. Leakage may further be prevented by the use of either or both of a valve seat formed in the valve body and a resilient washer situated on the leading end of the valve stem. When used, the resilient washer resiliently deforms against the valve body or the valve seat providing an enhanced seal further inhibiting fluid flow.

To allow water to flow through a traditional angle stop, the operator turns the gripping member of the valve in the opposite direction threading the valve stem further out of the valve body relieving the pressure of the valve stem against the valve body permitting the flow of fluid. When using either or both of a valve seat or resilient washer, fluid flow is permitted when the pressure is reduced on these components.

Attempts have been made in the prior art to develop an angle stop valve for installation on pressurized lines. U.S. Pat. No. 4,598,731 (Colson 1986) teaches an angle stop valve assembly incorporating a piercing point on the leading edge of the valve stem. However, the valve assembly taught in the Colson patent is complex and technologically inefficient. The Colson device is obsolete due to the introduction of commercially available, standard size stub-outs in the market place. The Colson patent teaches several complex embodiments of a valve assembly primarily used to accommodate varying dimensions of stub-out pipes which are no longer marketed for this purpose. One embodiment requires two halves of a hinged anchoring clamp be split and affixed around the stub-out pipe. Then the installer must secure the halves together with threaded and capped fasteners using a suitable tool for the capped fastener. After anchoring the clamp to the stub-out, the installer must then attach the valve assembly to the anchoring clamp before piercing the stub-out pipe. Other embodiments utilized special locking pins and locking slots or toggle subassemblies on anchoring clamps to secure the valve assembly to the stub-out pipe. The installer must learn the new and special ways in which these embodiments are attached to the stub-outs. These embodiments add a number of extra components to the angle stop valve requiring complex and expensive manufacturing methods, and are difficult to master and use.

It is therefore desirable to create a simplified system for installing plumbing fixtures that does not require shutoff of the water supply.

GLOSSARY

As used herein, the term "stub-out" shall refer to any element or system that is a preformed pipe with an open connecting end and a protruding end which is installed during the construction of a plumbing system before fixtures are installed. The protruding end of the stub-out protrudes through from the wall or floor, and the open end of the stub-out is connected to the main plumbing system. The open connecting end of the stub-out may be adapted for PEX, sharkbite, sweat soldered, glued or other connection methods for connecting with PEX, copper, plastic or other types of plumbing, including pipes.

As used herein "valve stem" means a component within an angle stop or valve assembly which operates to open or shut-off the flow of water.

As used herein the term "piercing valve stem assembly" shall refer to a valve stem incorporating a piercing point, which may either be permanently or removably affixed. A piercing valve stem assembly may be left hand threaded or right hand threaded. A piercing valve stem assembly may include a resilient washer or it may omit the resilient washer.

As used herein, the term "resilient washer" shall refer to any element that may be deformed providing an enhanced sealing effect. A resilient washer may include a rubber faucet type washer, a seating washer, a compression washer, a beveled washer, a flat washer, an o-ring, a rubber-like washer, a silicon washer or other methods known in the art for providing a fluid tight seal.

As used herein, the term "piercing point" shall refer to a permanently or removably affixed component which is used to pierce the protruding surface of a stub-out. A piercing point may include a point made of stainless steel, steel, brass, nickel, metal alloy, or ceramic. A piercing point may be serrated including one or more serrations, and may be mechanized to enhance piercing capability.

As used herein the term "gripping member" means any mechanism or system of components for turning the valve stem into and out of the valve body. A gripping member may include a handle, a wrench, a knob, a key, a screwdriver or a lever.

As used herein a "partially flattened stub-out" or "flat-end stub-out" is a stub-out shaped or contoured with a protruding end that is partially or substantially flattened to accommodate piercing. A "partially flattened stub-out" or "flat-end stub-out" may include or be constructed from one or more metal compositions or processes which make the portion pierced more susceptible to piercing. A partially flat-end stub-out or flat-end stub-out may incorporate varying thickness of metal, scoring, indenting, marking, dimpling, heat treating or a more malleable or more easily deformed material on the piercable portion of the stub-out.

SUMMARY OF THE INVENTION

The present invention is a piercing valve stem assembly and system comprised of a piercing valve stem assembly having a valve stem body with a piercing point securely affixed to the valve stem body. Further embodiments of the invention may utilize a flat end or partially flattened stub-out.

Exemplary embodiments may include a valve stem assembly comprised of a valve stem with a piercing point on its leading end and a resilient washer adjacent to and encircling the base of the piercing point. The piercing valve stem assembly system is comprised of a valve assembly containing the piercing valve stem assembly and a stub-out.

DETAILED DESCRIPTION OF EMBODIMENTS OF THE INVENTION

For the purpose of promoting an understanding of the present invention, references are made in the text hereof to embodiments of a angle stop valve, only some of which are described herein. It should nevertheless be understood that no limitations on the scope of the invention are thereby intended. One of ordinary skill in the art will readily appreciate that modifications such as the dimensions of the piercing valve stem assembly, alternate but functionally similar material(s) from which the angle stop valve is made, and the inclusion of additional elements are deemed readily apparent and obvious to one of ordinary skill in the art, and all equivalent relationships to those described in the written description do not depart from the spirit and scope of the present invention. Some of these possible modifications are mentioned in the following description. Therefore, specific details disclosed herein are not to be interpreted as limiting, but rather as a basis for the claims and as a representative basis for teaching one of ordinary skill in the art to employ the present invention in virtually any appropriately detailed apparatus or manner.

It should be understood that the drawings are not necessarily to scale, emphasis instead being placed upon illustrating the principles of the invention. In addition, in the embodiments depicted herein, like reference numerals in the various drawings refer to identical or near identical structural elements.

Moreover, the term "substantially" or "approximately" as used herein may be applied to modify any quantitative representation that could permissibly vary without resulting in a change in the basic function to which it is related. For example, one embodiment of the valve assembly as disclosed herein comprises a resilient washer acting against a valve seat. Other embodiments may omit the resilient washer and form a fluid tight seal by other means. Varying sized compression nuts, ferrules, valve stems, etc. may be substituted while having the same function as features of the invention described herein.

Figure 1:
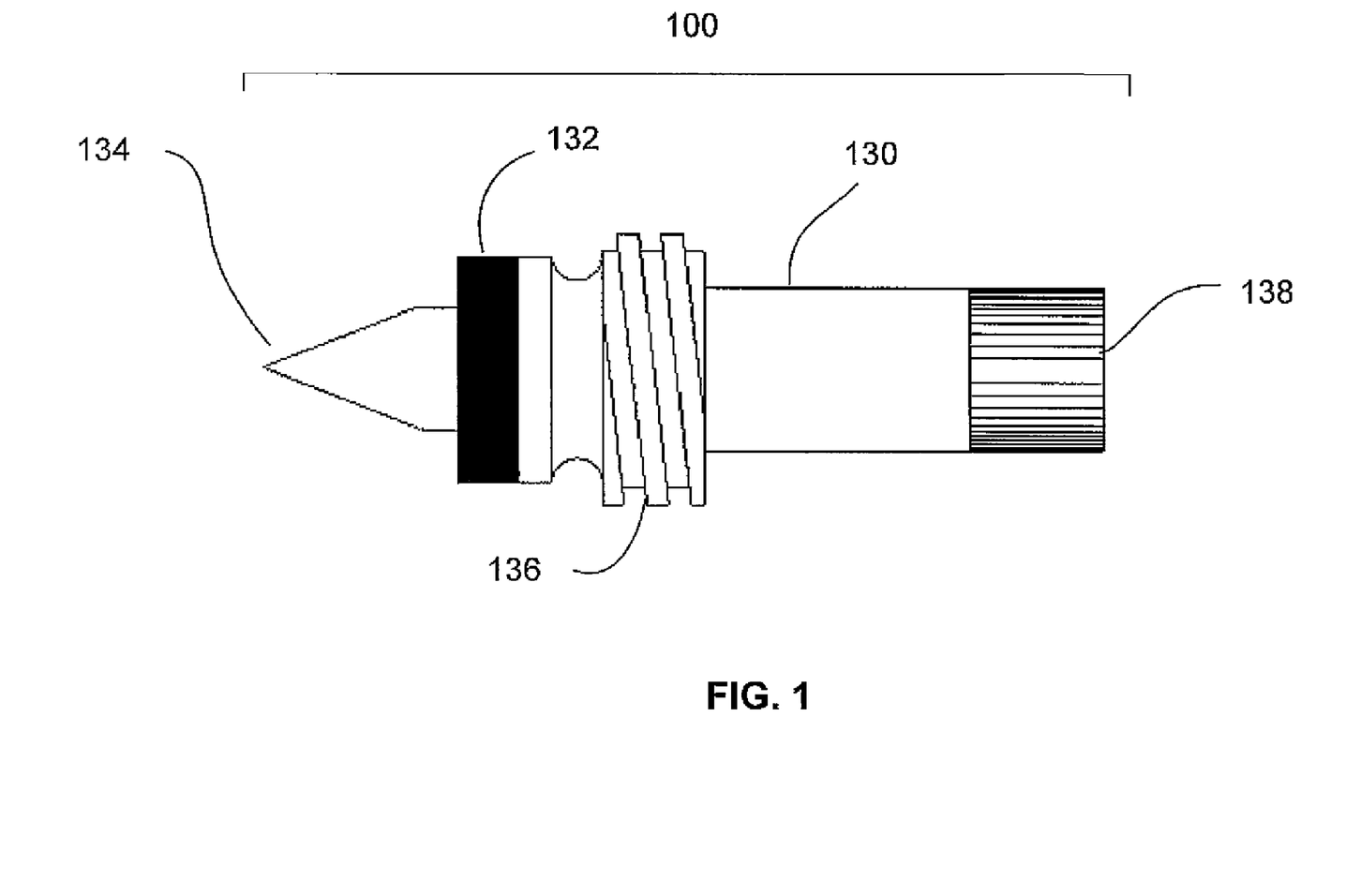
FIG. 1 shows the piercing valve stem assembly.

Referring now to the drawings, FIG. 1 shows an exemplary embodiment of piercing valve stem assembly 100 which is comprised of valve stem 130 and resilient washer 132. Piercing valve stem assembly 100 further includes piercing point 134, valve stem thread 136 and internal screw thread 138. Resilient washer 132 is situated adjacent to piercing point 134 on valve stem 130. In an alternative embodiment, piercing point 134 of valve stem 130 is replaced with a piercing point having at least one serration to aid in creating an orifice in the stub-out.

Figure 2:
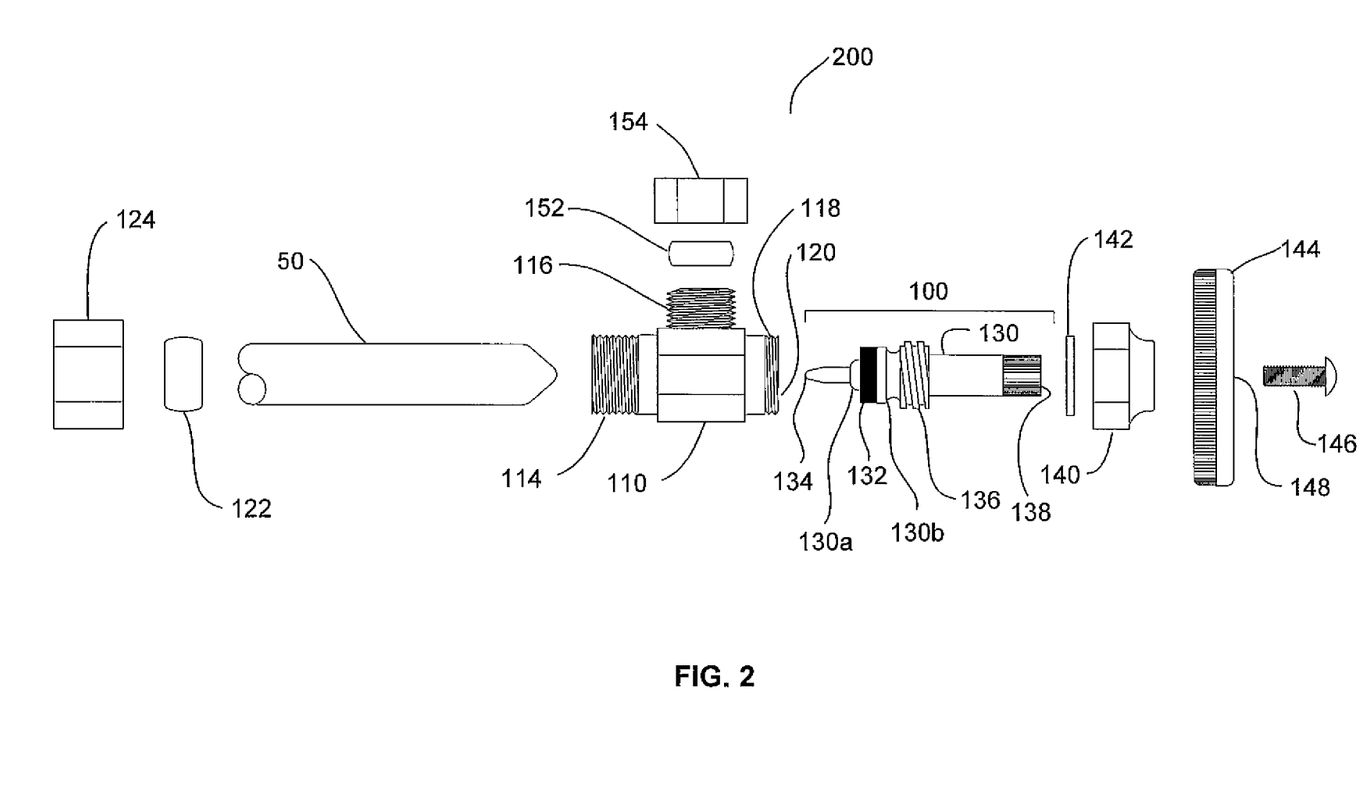
FIG. 2 shows an exploded view of one embodiment of the piercing valve stem assembly system

FIG. 2 shows an exploded view of an exemplary embodiment of valve assembly 200 which incorporates piercing valve stem assembly 100. In the embodiment shown, piercing valve stem assembly 100 is comprised of valve stem 130 and resilient washer 132. In the embodiment shown, piercing valve stem assembly 100 includes valve stem 130, and further includes a piercing point 134 which is fixably attached to valve stem 130 at valve stem end 130a. However, in alternative embodiments, piercing point 134 may be separately assembled, non-fixably attached or mechanized. In the embodiment shown, piercing valve stem assembly 100 further includes valve stem threads 136, and internal screw threads 138. Resilient washer 132 is situated adjacent to piercing point 134 on valve stem 130 at or near valve stem upper region 130b which is contoured in the embodiment shown. Alternate embodiments of valve stem 130 may vary in shape, size and contour and curvature, or omit contouring and curvature. It is understood that the piercing point 134 on the valve stem 130 may be formed with valve stem 130, or added to valve stem 130 in multiple ways included, but not limited to molding, casting, forging, milling, welding, adhering, CNC machining or threading. It is understood that the valve stem 130 may be constructed from stainless steel, steel, brass, nickel, metal alloy, resin, or ceramic.

In the embodiment shown in FIG. 2, piercing valve stem assembly 100 may be placed within valve body 110. In the embodiment shown, valve body 110 features male threaded inlet shank 114, male threaded supply line shank 116, male threaded packing nut shank 118 and female valve stem threads 120. Supply line shank 116 may be threaded as embodied herein, or it may omit threads in favor of alternate attachment means such as, quick release fittings, compression fitting, flanges, glued, sweated or soldered connections.

As further shown in FIG. 2, piercing valve stem assembly 100 is placed adjacent to packing gasket 142. Packing gasket 142 is placed adjacent to packing nut 140. Packing gasket 142 forms a fluid tight seal when placed against valve stem 130 when packing nut 140 is tightened along male threaded packing nut shank 118 on valve body 110. In the embodiment shown, gripping member 144 is secured to piercing valve stem assembly 100 by the use of screw 146 passing through aperture 148 in gripping member 144 and engaging the internal screw threads 138 of the valve stem 130. The gripping member 144 may be attached to the piercing valve stem assembly 100 by alternative means including but not limited to being adhesively attached or snapped on.

Also included in the embodiment of the piercing valve stem assembly 100 shown in FIG. 2 are inlet compression nut 124 and inlet ferrule 122, which secure the valve assembly 100 to the stub-out 50. Inlet ferrule 122 forms a fluid tight seal against stub-out 50 when inlet compression nut 124 is tightened along male threaded inlet shank 114 on valve body 110.

Additionally, the embodiment of the valve assembly 200 shown in FIG. 2 includes supply line compression nut 154 and supply line ferrule 152, which secure valve assembly 200 to a supply line. Supply line ferrule 152 forms a fluid tight seal against a supply line when supply line compression nut 124 is tightened along male threaded supply line shank 116 on valve body 110.

Figure 2A:
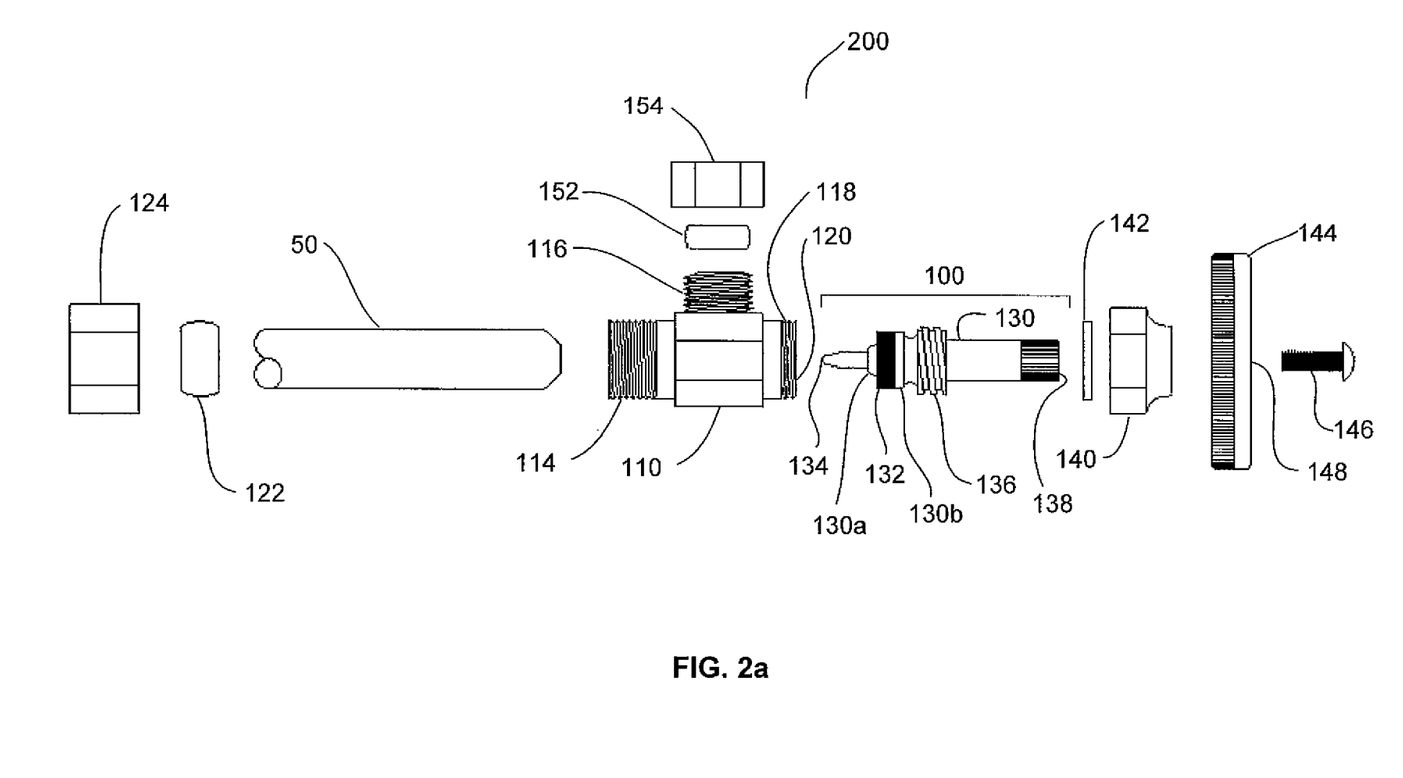
FIG. 2a shows an exploded view of one embodiment of the piercing valve stem assembly system with a partially flattened stub-out.

FIG. 2*a* shows valve assembly 200, as shown in FIG. 2, which uses partially flattened stub-out 50

Figure 3:
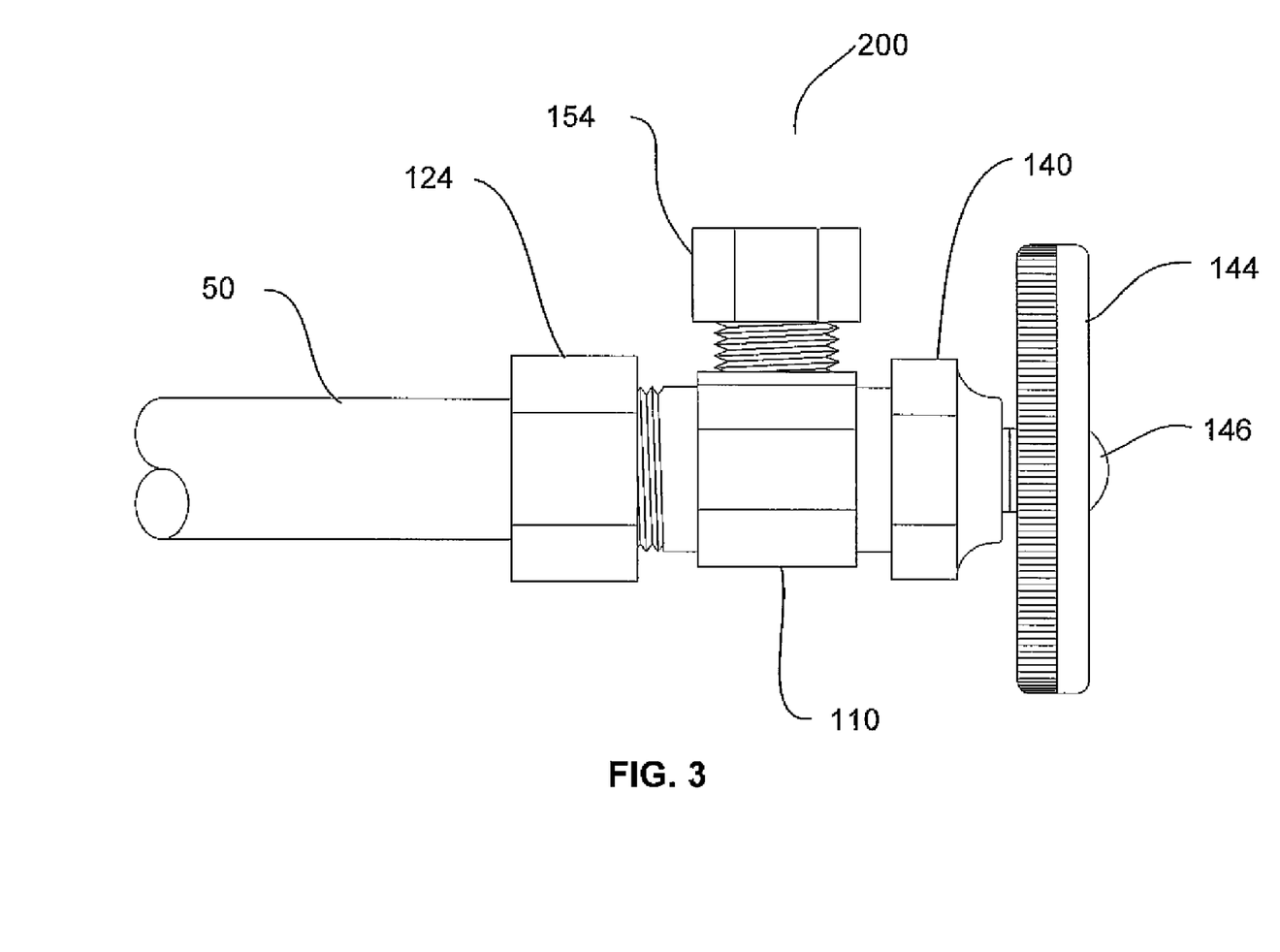
FIG. 3 shows a side view of an angle stop valve assembly with the piercing valve stem assembly in which the stub-out has been pierced

FIG. 3 shows an exemplary embodiment of valve assembly 200 in which piercing point 134 (not shown) has pierced stub-out 50. In the embodiment shown, outward appearance of valve assembly 200 once installed is indistinguishable from a conventional angle stop valve. The valve assembly 200 is fitted to stub-out 50 by tightening inlet compression nut 124 against valve body 110. In the embodiment shown, during installation of the valve assembly 200 on the stub-out 50 the gripping member 144 is turned so as to gradually pierce stub-out 50. Once the piercing point 134 (not shown) has pierced stub-out 50, gripping member 144 is turned in the opposite direction allowing fluid to flow through valve assembly 200. With the installation and piercing procedures completed, valve assembly 200 operates indistinguishably from a conventional angle stop valve.

Figure 4:
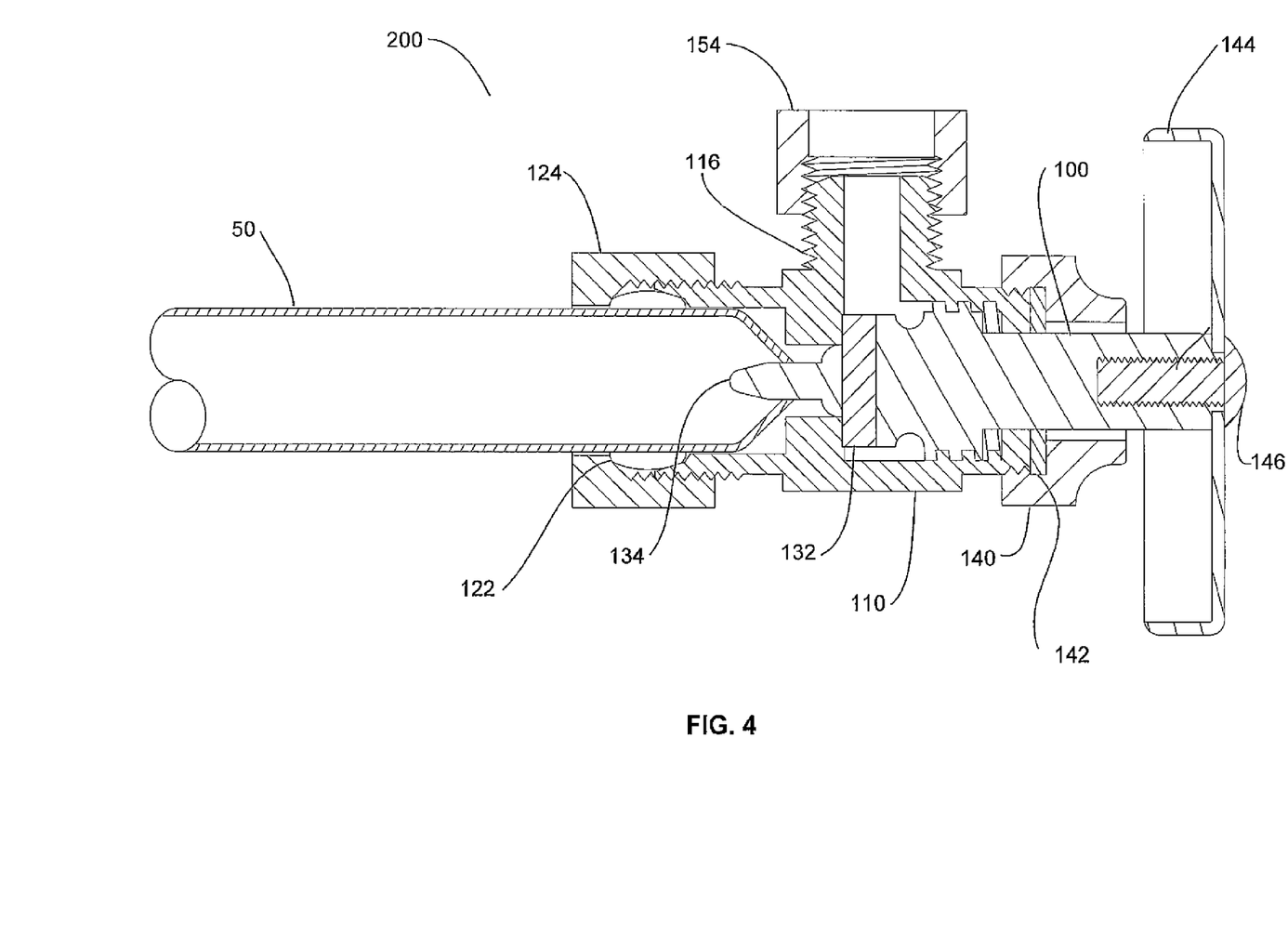
FIG. 4 shows a sectional side view of one embodiment of the piercing valve assembly system.

FIG. 4 shows a sectional side view of an embodiment of piercing valve stem assembly 100. In the embodiment shown, valve assembly 200 is sealed in place along stub-out 50 through the use of inlet compression nut 124 compressing inlet ferrule 122. Piercing point 134 integral to piercing valve stem assembly 100 is shown having pierced the end of stub-out 50. Piercing valve stem assembly 100 is fully seated within valve body 110, compressing resilient washer 132 against valve body 110. To prevent fluid from leaking past piercing valve stem assembly 100, packing nut 140 compresses packing gasket 142 against valve body 110 forming a fluid tight seal around piercing valve stem assembly 100. Gripping member 144 is secured against piercing valve stem assembly 100 by screw 146. Supply line compression nut 154 is threaded along male threaded supply line shank 118.

Figure 4A:
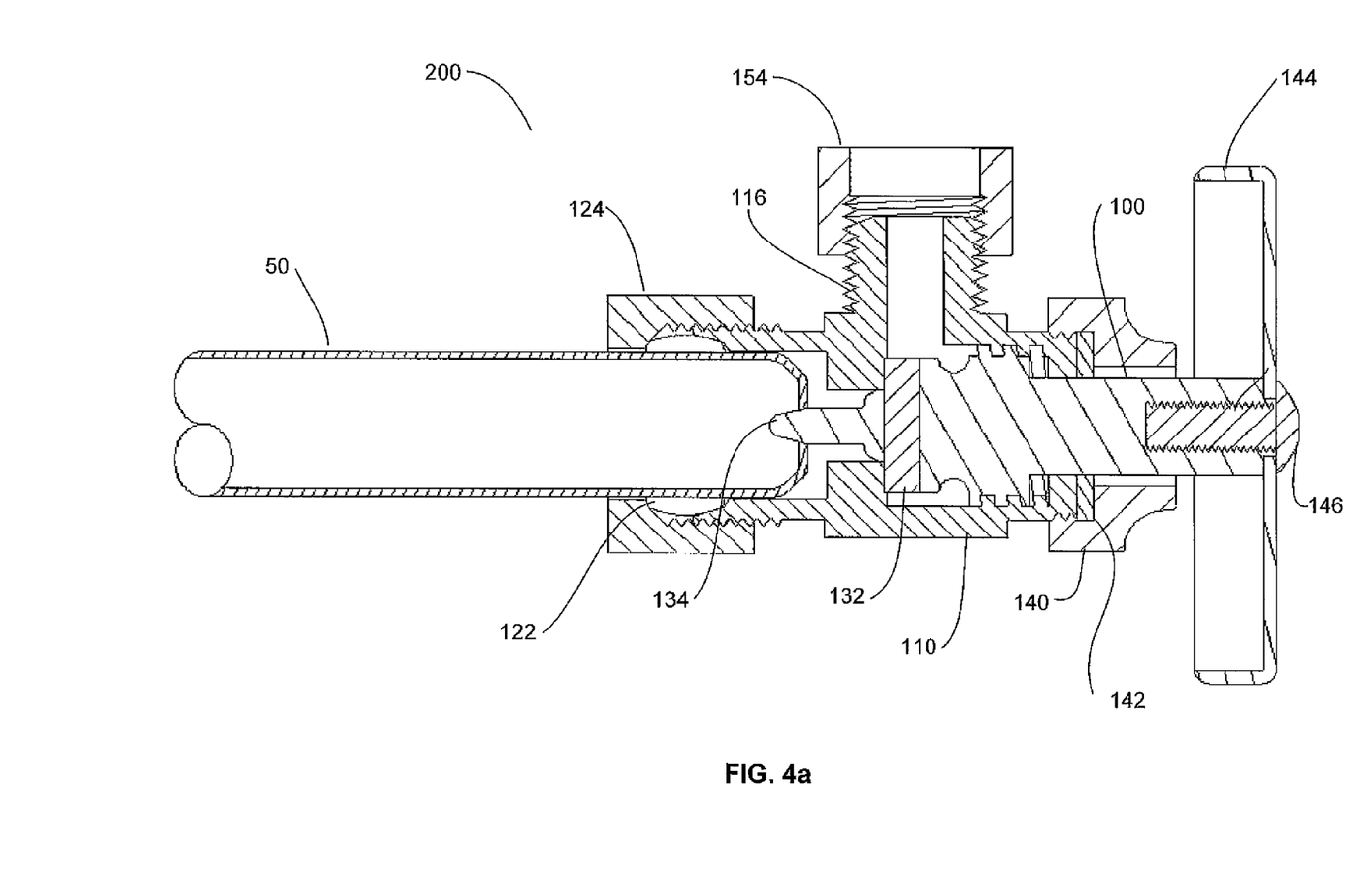
FIG. 4a shows a sectional side view of one embodiment of the piercing valve assembly system with a partially flattened stub-out.

FIG. 4*a* shows a sectional side view of an alternative embodiment of piercing valve stem assembly 100 which uses partially flattened stub-out 50.

While piercing valve stem assembly 100 has been shown and described with respect to an illustrative embodiment and used in accordance with the present invention, it is to be understood that the same is not limited thereto, but is susceptible to numerous changes and modifications as known to a person of ordinary skill in the art, and it is intended that the present invention not be limited to the details shown and described herein, but rather cover all such changes and modifications obvious to one of ordinary skill in the art.

What is claimed is:

1. A piercing valve stem assembly for insertion in an angle stop comprised of:
   a piercing valve stem assembly which is a single integrally machined component comprised of a valve stem portion and a piercing point;
   at east one stub-out of a constant outer diameter which has at least one partially flattened end with a piercable area of a thinner, malleable material to accommodate entry of said piercing point; and
   at least one piercing valve stem assembly positioning knob adapted to selectively position said piercing valve stem assembly within a valve body.

2. The piercing valve stem assembly of claim 1, wherein said valve stem portion is threaded.

3. The piercing valve stem assembly of claim 1, wherein said valve stem portion includes an internal screw thread.

4. The piercing valve stem assembly of claim 1 which further includes at least one resilient washer adjacent said piercing point.

5. The piercing valve stem assembly of claim 1, in which said piercing point is constructed from a material selected from a group consisting of stainless steel, steel, brass, nickel, metal alloy, and ceramic.

6. The piercing valve stem assembly of claim 1, in which said valve stem portion is constructed from a material selected from a group consisting of stainless steel, steel, brass, nickel, metal alloy, resin, and ceramic.

7. A piercing valve stem assembly system consisting of:
   a piercing valve stem assembly comprised of
      a single integrally machined piercing valve stem component with a valve stem portion with an integral piercing point and valve stem thread,
      at least one gripping member affixed to said valve stem, and
      at least one resilient washer adjacent said piercing point,
   at least one stub-out with an inner diameter and a constant outer diameter which has at least one partially flattened end with a piercable portion of a thinner, malleable material to accommodate entry of said piercing point;
   a valve body comprised of
      a male threaded inlet shank with an inner diameter greater than said constant outer diameter of said at least one stub-out,
      a male threaded supply line shank, and
      a male threaded packing nut shank with an outer diameter, outer thread and female valve stem thread wherein said valve stem thread corresponds to said female valve stem thread, and
   at least one valve body securing component fixedly attaching said valve body to said at least one stub-out comprised of
      at least one inlet ferrule with an outer diameter and an inner diameter greater than said constant outer diameter of said at least one stub-out, and
      at least one inlet compression nut with an inner diameter greater than said outer diameter of said at least one inlet ferrule and interior threads which correspond to said male threaded inlet shank.

8. The system of claim 7 in which said gripping member is selected from a group consisting of a handle, a wrench, a knob, a key, a screwdriver and a lever.

9. A piercing valve stem assembly system comprised of:
   a piercing valve stem assembly comprised of:
      a single integrally machined piercing valve stem component with a valve stem having an outer diameter with an integral piercing point and valve stem thread, at least one gripping member affixed to said valve stem, and
at least one resilient washer,
a flat-end stub-out with an inner diameter and a constant outer diameter which has at least one partially flattened end with a piercable portion of thinner, malleable material to accommodate entry of said piercing point;
a valve body comprised of
a male threaded inlet shank with an inner diameter greater than said constant outer diameter of said at least one stub-out,
a male threaded supply line shank, and
a male threaded packing nut shank with an outer diameter, outer thread and a female valve stem thread wherein said valve stem thread corresponds to said female valve stem thread,
at least one valve stem securing component comprised of
a packing gasket with an inner diameter greater than said outer diameter of said valve stem, and
a packing nut with an inner diameter greater than said outer diameter of said male threaded packing nut shank and an inner thread wherein said inner thread corresponds to said outer thread of said male threaded packing nut shank,
at least one valve body securing component fixedly attaching said valve body to said at least one stub-out comprised of
at least one inlet ferrule with an outer diameter and an inner diameter greater than said constant outer diameter of said at least one stub-out, and
at least one inlet compression nut with an inner diameter greater than said outer diameter of said at least one inlet ferrule and interior threads which correspond to said male threaded inlet shank.

10. The system of claim 9 in which said gripping member is selected from a group consisting of a handle, a wrench, a knob, a key, a screwdriver and a lever.

11. The system of claim 9, in which said piercing point is constructed from a material selected from a group consisting of stainless steel, steel, brass, nickel, metal alloy, and ceramic.

12. The system of claim 9, in which said valve stem is constructed from a material selected from a group consisting of stainless steel, steel, brass, nickel, metal alloy, resin and ceramic.

* * * * *